May 16, 1961 H. KWART ET AL 2,984,146
AUTOMATIC RECORDING SPECTROPHOTOMETER
Filed April 13, 1953 4 Sheets-Sheet 1
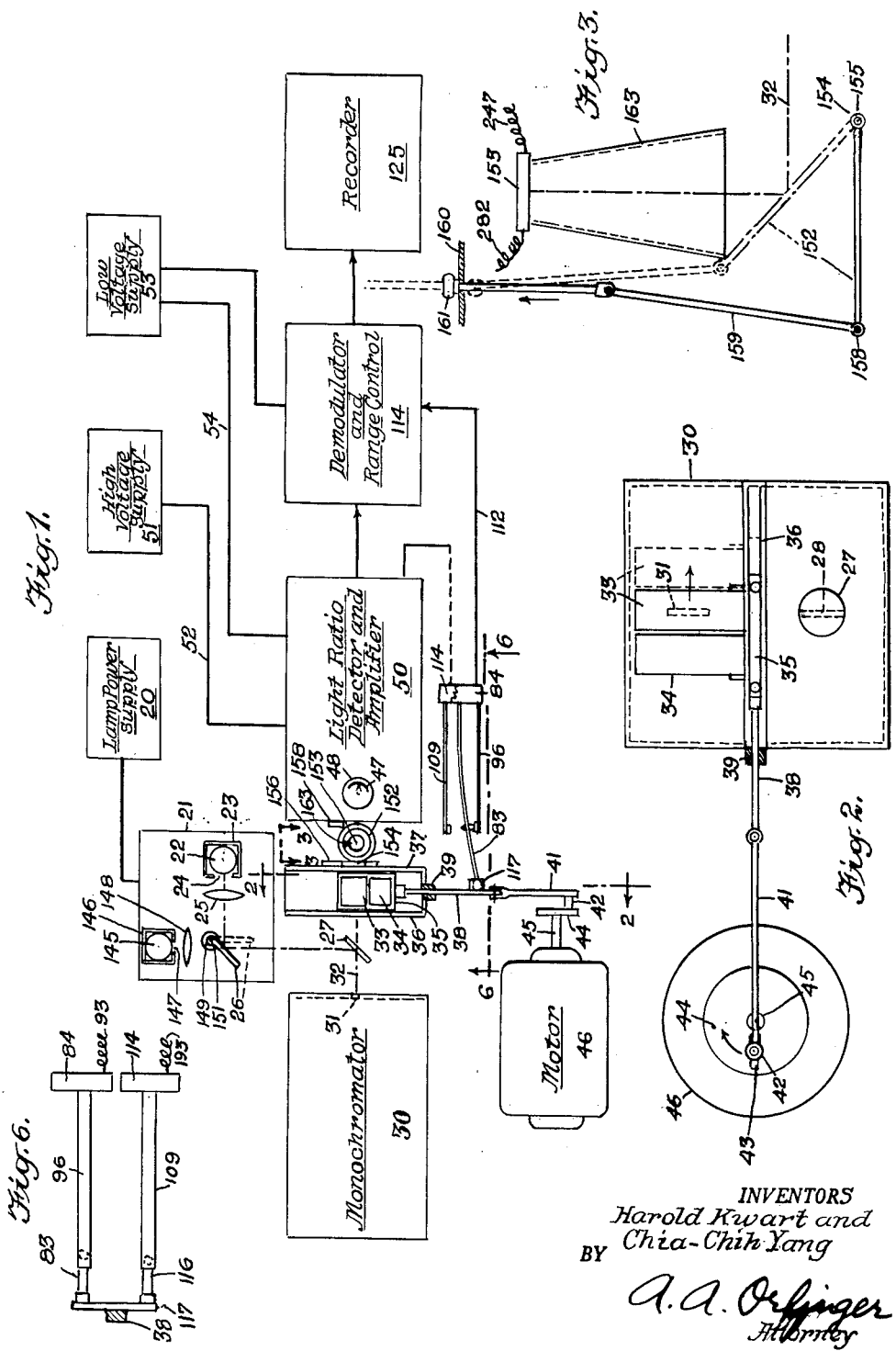
INVENTORS
Harold Kwart and
BY Chia-Chih Yang
A. A. Ofinger
Attorney

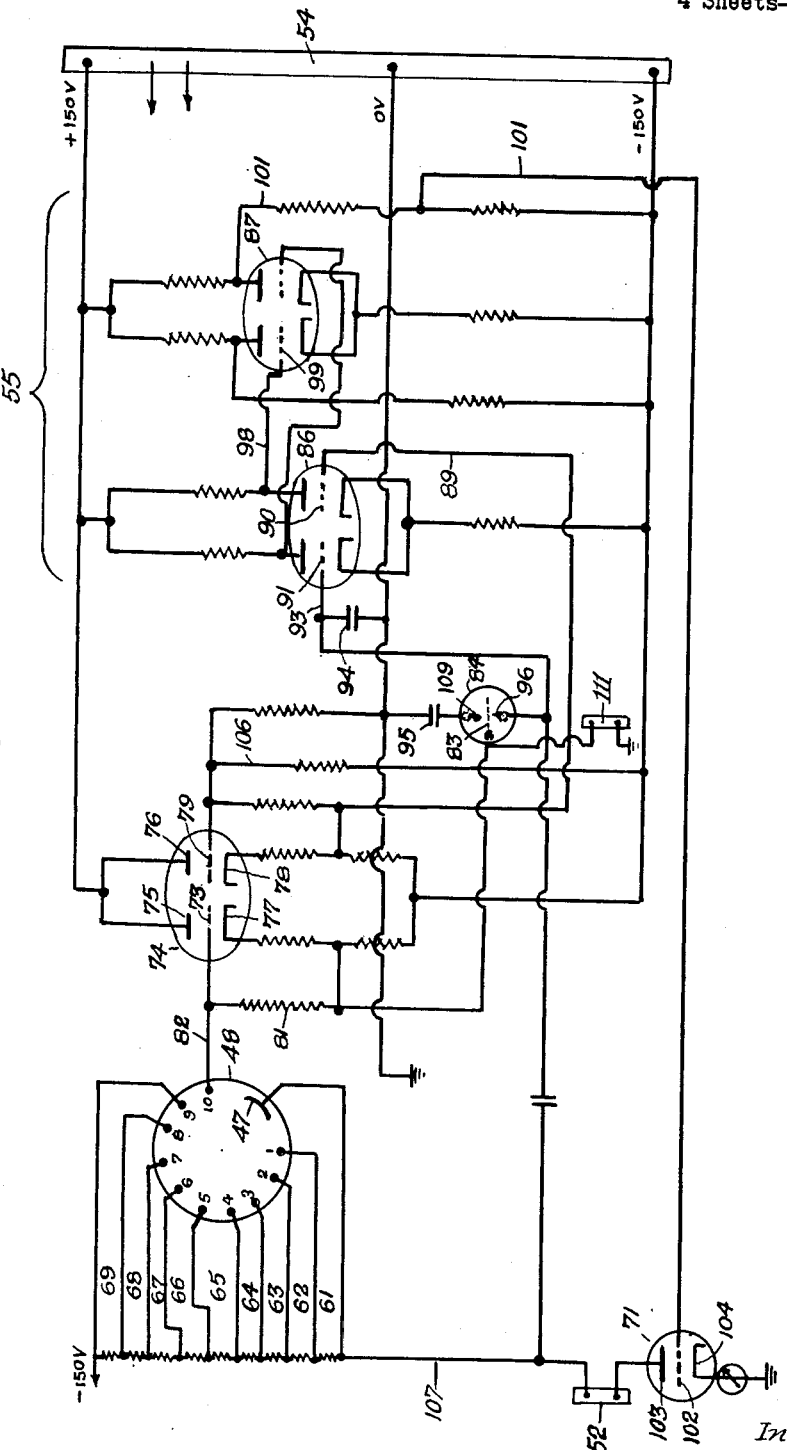

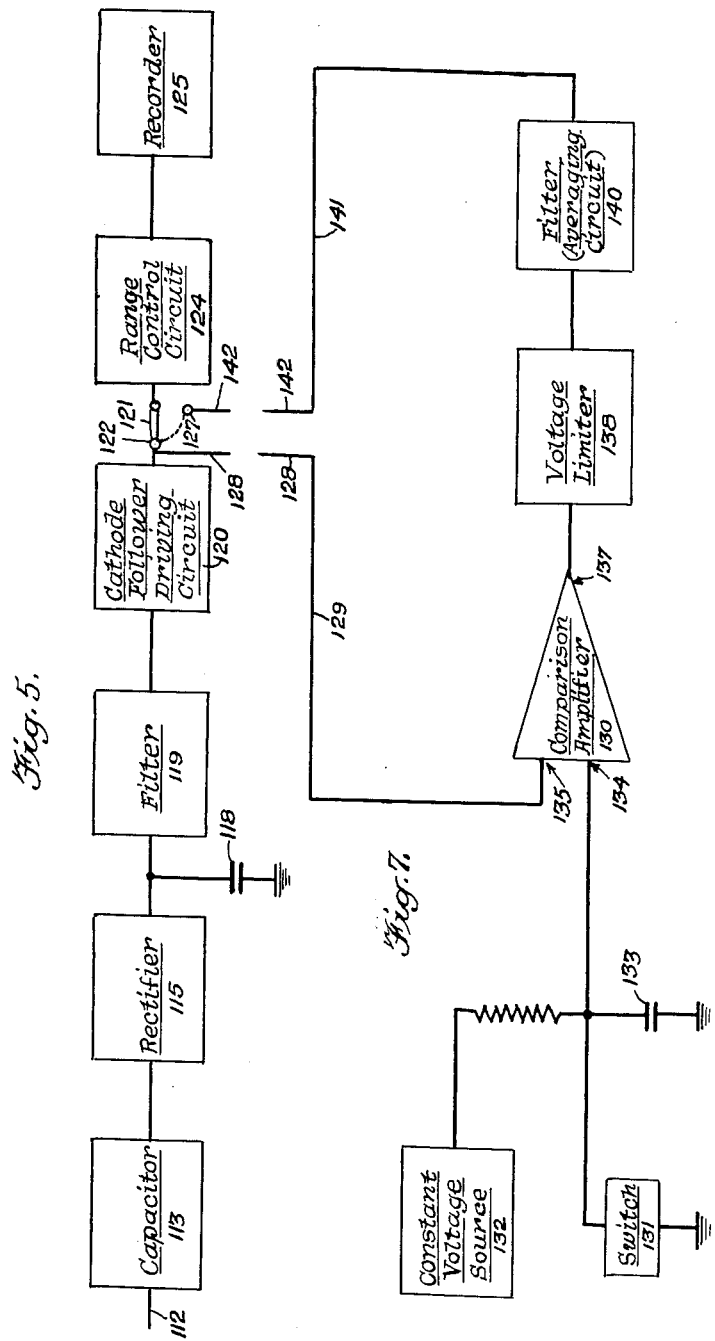

United States Patent Office 2,984,146
Patented May 16, 1961

2,984,146

AUTOMATIC RECORDING SPECTRO-PHOTOMETER

Harold Kwart, Brookside Park, Del., and Chia-Chih Yang, Philadelphia, Pa., assignors to Joseph Greenspan Filed Apr. 13, 1953, Ser. No. 348,388

7 Claims. (Cl. 88—14)

This invention is an automatic recording spectrophotometer effective over the entire range of the ultraviolet, visible and infra-red regions of the spectrum. This spectrophotometer permits recording the light density comparison between a light transmitting sample cell and a comparison or reference cell, and alternatively to record their comparative light transmissivity.

The spectrophotometers heretofore available present certain disadvantages and possess certain inherent limitations that adversely affect their performance. In some of them, both the sample and the reference cells are held respectively at stationary positions, and a beam of monochromatic light is either (a) flickered alternatively first through the sample and then through the reference, or (b) split into two components, or two separate, beams, each of which travels its own path. Then one of these beams passing through the sample cell and the other through the reference cell respectively separately impinges on a photosensitive device.

Obviously, the systems embracing either of the two foregoing methods of handling the light beam require employing angularly positioned mirrors, either stationary or moving, and/or optical devices, such as lenses, to deflect the light path in the desired direction. Moreover, such use of either mirrors or lenses always lowers the intensity of the incident light beam and thus results in reducing the accuracy, precision and overall efficiency of the procedure for examining the comparative transmissivity of the sample and reference media.

Then too, the difficulty of obtaining mirrored surfaces of perfectly matched reflectivity introduces corresponding difficulties in comparing the intensity of the components into which the light beam has been split, or flickered, for separate passage through the sample and reference cells respectively.

Since in all prior arrangements embracing a flickering or other mechanism for altering the direction of a monochromatic beam, at least two, and often more, mirrors or optical devices must be used, the light intensity losses in such systems accumulate to a considerable significance.

Another earlier spectrophotometer reciprocates a carriage holding a pair of mirrors a fixed distance from one another, to deflect a light beam alternatively first through the sample cell and then through the reference. In it, each of these cells is in a fixed position and the carriage moves parallel to the path of the incident light beam, whereby the length of the incident beam path for the sample cell is different from that for the reference cell. Along with this, it is pertinent that a practical monochromator provides a divergent light beam. Accordingly, this inequality in the length of path of the divergent light beams creates an inequality in the intensities of the incident beam passing respectively through the two stations.

Moreover, depending on the comparative angle at which the respective beams deviate from perfectly parallel radiation, reflection losses from the respective entrance and exit windows of the cells at the sample and reference stations will differ. This then compounds the error stemming from the passage of unequal light intensities through the sample and reference media.

The various disadvantages and limitations in the earlier spectrophotometers, stemming from the use of the split beam, or oscillating beam, or a beam alternatively changing in length, do not occur in the device of the invention. In it the sample and reference cells respectively alternatively cross perpendicularly the path of a fixed, single beam of monochromatic light. As the motion of the individual cells is perpendicular to the beam, no significant deviation in its direction or change in its length can occur.

In the operation of the spectrophotometer of the invention, the passage of either one of the cells across the stationary light beam is referred to as a single phase, or merely as a phase; and then two successive phases (i.e. the passage of the sample cell across the beam followed by the passage of the reference cell across it) constitute a cycle.

The emerging transmitted beam, alternatively leaving each cell in succession, then is picked up in a light ratio detector and amplifier. There initially it impinges on the light sensitive surface of a photo-electric element sensitive to the impulses or photons of ultra-violet, visible, or infra-red light, depending on which of these is the character of the monochromatic beam of light that is passed through the sample and reference cells during their respectively successive phases in the particular cycle. This spectrophotometer is adopted to use whichever such photo-sensitive element responds to the specific wave length of the beam of monochromatic light used at any period or cycle of its operation.

While this spectrophotometer can be used to give a reading for a comparison merely at a single wave length or over a limited range or portion of the spectrum, it is adapted for use even over the entire spectrum. For use over the broad ranges, it is ordinarily desirable to have a separate cycle correspond to each separate wave length or narrow band of the spectrum that the particular source of monochromatic light employed is set to emit in succession over the specific portion of, or the entire, spectrum.

Since the light energy or photons impinging on the photo-sensitive surface of the photo-sensitive element of the spectrophotometer of the invention cause it to generate an alternating current signal, a further unique and significant feature of the invention is the inclusion of a means for rectifying that signal in synchronism with each separate individual phase (consisting of the passage of either the reference or the sample cell across the stationary light beam) to convert that signal into a direct current one. The timing of the operation of this rectifying means (conveniently called the photo-sensitive element signal rectifier), advantageously is tied in with the mechanism for reciprocating the cells across the light beam.

The rectified signals then are compared by electronic circuits exemplified more fully below. These in turn transmit a second, but direct current signal, proportionate to the magnitude of the ratio of these rectified signals. This ratio signal is then amplified. (The combination of circuits involving the photo-sensitive element, the rectification, the comparison and amplification can be referred to conveniently as the light ratio detector and amplifier.) The amplified ratio signal can then be recorded directly by any of a number of, for example, available standard electrically or mechanically operated recording devices. However, the apparatus of the invention includes additional circuits interposed before the recorder to influence the nature of the obtainable record, as is developed more fully below.

The spectrophotometer of the invention is useful in a variety of applications. To illustrate, it can be used to determine the precentage of a certain substance in a solution, a quantity of which is taken to fill the sample cell. The standard cell is filled with a quantity of the solvent used to dissolve the substance. The two cells are then passed in sequence perpendicularly across the beam of monochromatic light. Then the comparison of the successive, rectified signals, corresponding to the sample and reference phases of a cycle (i.e. two successsive phases) can be produced as a ratio and amplified. In that case, the value recorded will be proportional to the percentage of the incident light transmitted by the substance under test in the solvent.

However, the apparatus of the invention is not limited merely to recording a ratio (i.e. a quotient), for the signals generated by the photo-electric element, after rectification, comparison and amplification, can be handled by other electronic circuits, and even mechanical devices, to record other mathematical relationships between the light transmitted through the sample and a reference cell as each of them in succession crosses the monochromatic light beam.

Other of the significant features of the invention will be developed below. However, as to its more specific details, the invention is illustrated by, but not restricted to, the embodiments discussed in the following description in relation to the accompanying drawings, wherein:

Figure 1 shows a diagrammatic and schematic arrangement of the various of the elements of the automatic recording spectrophotometer;

Figure 2 is a vertical elevational, enlarged view (along line 2—2 of Fig. 1, looking as directed by the arrows) of the light slit end of the monochromator and showing the sample and reference cells, their carrier and the mechanism for reciprocating them;

Figure 3 is an enlarged, side elevational view (along line 3—3 of Fig. 1, looking as directed by the arrows) showing means for shifting the monochromatic light beam, when infra-red, to, and including, a photo-electric element sensitive to such light;

Figure 4 is a circuit diagram of a light ratio detector and amplifier including one form of photo-electric cell sensitive to ultra-violet and visible light;

Figure 5 is a schematic arrangement for the demodulator elements and the recorder;

Figure 6 is an enlarged, side elevational view (along line 6—6 if Fig. 1, looking as directed by the arrows, with the rear parts omitted) of two mechanical switches (e,g, single pole double throw), one in the light ratio detector and amplifier circuit and the other in the demodulator circuit;

Figure 7 is a schematic layout for a signal conversion circuit that can be shunted into the demodulator and recorder circuit of Fig. 5, to enable recording optical density.

Figure 8:
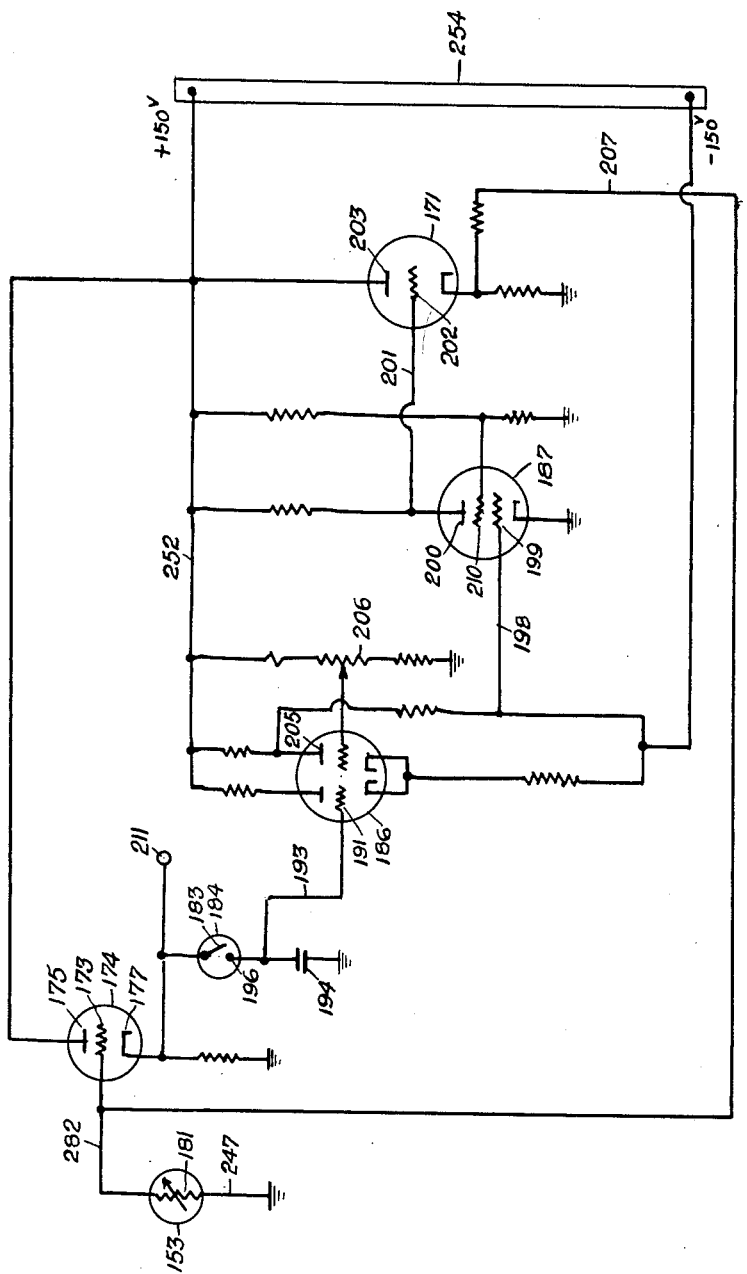
Figure 8 is a circuit diagram of a modified from of light ratio detector and amplifier, including a photoelectric cell sensitive to infra-red light.

In Figure 1 of the drawings, light lamp power supply 20 supplies current to the light source base 21 to light a lamp 22 enclosed in its housing 23 having a light port 24. From it the rays leave, pass through a collimating lens 25 and are reflected by light source mirror 26 at an angle to the monochromator light feed, or entrance, mirror 27. The latter reflects the same light rays through the lower or entrance slit 28 (Fig. 2) of, and into, any available, suitable model of a monochromator 30, for example, such as is described in the paper "A Quartz Photoelectric Spectrophotometer," starting at page 682 of volume 31, No. 11 (November 1941), of the Journal of the Optical Society of America. There these light rays are converted in known manner into light of a single color or very narrow wave length band which emerges from the monochromator by its upper or exit slit 31 as the monochromatic light beam 32, for example, as a somewhat divergent ribbon of light approximately one-half inch in height and of a width depending on the exit slit width.

The emergent monochromatic beam 32 passes first, for example, through the standard or reference cell 33, one of two rectangular parallelepiped, transparent comparison cells (the other being the test or sample cell 34) having identical dimensions and the same optical clarity when empty. The two cells are firmly held, side by side, in a plane perpendicular to the path of beam 32 on a carriage 35 reciprocatably mounted on guide-tracks 36 and 37. The comparison cells can be reciprocated at any practical rate. A presently efficiently effective rate is eight cycles per second although any other suitable rate can be used.

Carriage 35 is reciprocated in these guide-tracks alterately successively to place, for example, first reference cell 33, and then sample cell 34, transversely across beam 32, by the reciprocation of driving arm 38 through its bearing 39 by connecting rod 41 driven by crank pin 42. The latter is fixedly positioned eccentrically (and adjustably so, dependent on the width of the comparison cells and, in a measure, on the desired cycle speed) in slot 43 on crank wheel 44 mounted on the shaft 45 of electric motor 46. Desirably smooth operation is available with a synchronous motor 46, for example, geared down (by known means) to say 480 r.p.m. Any other suitable means for reciprocating the carriage 35 can be used, for example, electromagnetically operated plungers as in opposed solenoids.

As indicated, the emergent monochromatic beam 28 is directed in a fixed and non-deviating line or path whereby, after passing through either one of the comparison cells, it impinges directly on the photo-sensitive surface 47 of the photo-electric element 48. The latter is one capable of converting the impinging light energy into, and transmitting it as, an electrical signal of magnitude corresponding to that of the light flux reaching it. For any wave length in the ultra-violet, the visible and infra-red light ranges, a photo-multiplier of known design is suitable; although any other photo-sensitive element responding to such light can be used. For converting the light energy to an electrical signal when the beam 32 emerging from the comparison cells is of infra-red range, a photo-electric element sensitive to infra-red light, for example, a photo-resistive cell as a lead, cadmium or thallium sulfide, or selenide cell, is introduced into the system, in a manned described further below, to replace whichever one sensitive to the other light ranges is used.

In any event, whatever the wave length of the light beam passing through the comparison cells, the beam strikes the photo-sensitive element 48 at exactly the same location or spot and has the same dimensions, i.e. width (side to side thickness of the ribbon of light), height, and length (distance from the slit to the photosensitive element) for each phase (reference or sample) of each cycle.

*The light ratio detector and amplifier*

The monochromatic light beam 32, after emerging from either one of the comparison cells, impinges, for example, on the cathode 47 of photo-multiplier 48 of the light ratio detector and amplifier 50 (see Figure 4). The light ratio detector consists essentially of four fundamental parts, namely: (a) a light sensitive device, the sensitivity of which is controllable by varying voltage applied to, or current passed through, it; for example, the photo-multiplier 48, (b) a direct coupled amplifier, (c) a memorizing condenser, and (d) a high voltage controlling vacuum tube.

Hooked up with the high voltage power supply source 51 (Fig. 1; which can be a rectifier from an A.C. circuit, or even a set of batteries when cost is not a factor) through the lead 52 (Fig. 4) with the filament and plate power supplies (i.e. the low voltage power supply source 53, Fig. 1 and its terminal bar 54, Fig. 4) for the comparison amplifier 55 (Fig. 4), and with the mechanical or vibrator switch 84 (operated, as described below, by the drive arm 38 that reciprocates carriage 35 bearing the comparison cells), the light ratio detector converts the alternating current signals produced by the light sensitive device 48, after the monochromatic light beam 32 leaving the comparison cells impinges on its photo-sensitive surface, into a direct current voltage. The amplitude of the latter is directly proportional to the ratio of the light emerging from one cell (e.g. the reference) to that from the other (the sample). This ratio is called the transmittance of the first cell with respect to the second.

Alternatively, the output circuit from the light ratio detector and amplifier can also be arranged to yield an alternating voltage whose amplitude is directly proportional to unity minus the transmittance. This is called the absorptance of the first cell with respect to the second.

As is understood, the electrons given off by the cathode 47 of photo-multiplier 48 are picked up at its dynode 1 and with their impulse being consecutively progressively increased as they are picked up in sequence at each succeeding one of the dynodes 2 through 9. The voltage impressed from the high voltage supply source 51 through lead 52 across each of the circuits 61 through 69 (each with its own resistance as illustrated, and tied in with the corresponding dynodes 1 through 9) governs the degree to which the original impulse or signal is ultimately multiplied. Then the actual voltage applied to the photo-multiplier 48 is controlled by the high voltage controlling vacuum tube 71 which in turn is governed by the comparison amplifier 55 (a part of the direct coupled amplifier) in a manner as explained below.

The voltage impulse developed at the anode 10 of photo-multiplier 48 is applied to the grid 73 of the twin triode vacuum tube 74, constituting the balanced cathode follower, having plates or anodes 75 and 76 and cathodes 77 and 78 and second grid 79. The photo-multiplier load resistance 81 is interposed between the output lead 82 (connecting anode 10 with grid 73 of cathode follower 74) and switch reed 83 of mechanical or vibrator switch 84 (e.g. the upper one of two superimposed ganged single pole double throw switches).

The direct coupled amplifier of the light ratio detector, in addition to the cathode follower 74, includes the comparison amplifier 55. The latter consists of two twin vacuum tubes 86 and 87 respectively, with the grid 79 of cathode follower 74 connected through lead 89 as input to grid 90 of vacuum tube 86. Grid 91 of tube 86 is connected through lead 93 to memorizing condenser 94 which is grounded. Then also lead 93 connects both grid 91 of tube 86 and memorizing condenser 94 with contact 96 of mechanical switch 84.

The output of twin vacuum tube 86 is connected through lead 98 as input to grid 99 of twin vacuum tube 87. Then the output of tube 87 is connected through lead 101 to grid 102 of controlling vacuum tube 71. The latter can be any triode vacuum tube. It serves to control the current flowing in the high voltage circuit and thus to control the voltage applied to the photo-multiplier 48. This is accomplished by varying the voltage to grid 102 by an adjusting voltage impressed as output from vacuum tube 87 of comparison amplifier 55. The plate or anode 103 of control tube 71 is connected to lead 52 from the high voltage supply 48 and its cathode 104 is grounded.

The balanced cathode follower 74 functions to regenerate the electrical voltages across the photo-multiplier load resistance 81 at a lower impedance level in order to charge and discharge the memorizing condenser 94 at a higher speed. Cathode follower 74 also provides enough power to operate the demodulator circuit, which is more fully considered further below, when the spectrophotometer is used to provide a record proportional to percentage of light absorption.

The comparison amplifier 55, by its two twin triode tubes 86 and 87, consists of two balanced difference or push pull stages. It provides an amplified output that is proportional to the difference of two input voltages, namely: (1) one from memory condenser 94, and (2) the other from reference voltage 81, and is insensitive to their common level.

The amplified alternating current signal that originates from the photo-sensitive element 48 is rectified into a direct current signal that can be transmitted to the recording device to provide a record of the ratio of the intensity of the light transmitted by the sample and reference cells respectively. Undesirable effects that stem from variations in the speed of crossing the beam 32 of monochromatic light alternately by the comparison cells, or in the speed of driving motor 46, are advantageously eliminated by linking the phases in the rectification to the respective phases in the cycle of the crossing of the light beam by the comparison cells.

Such precise phase synchronization, or phasing, of the optical cycle to the electrical rectification cycle is efficiently done, according to the invention, by mechanically linking switch reed 83 of the single pole double throw switch 84 to the driving arm 38 connected to cell carriage 35.

*Operative synchronization*

Accordingly, when, for example, the reference cell intersects light beam 32 between exit slit 31 and photo-sensitive element 48, switch reed 83 is closed on contact 96. Then during this first phase (i.e. reference cell across light beam), the amplifying circuit (including lead 101 to grid 102) operates to make the voltage across photo-sensitive element load resistance 81 the same as that across the reference voltage line 106, by controlling the dynode voltage applied to the photo-multiplier 48 through lead 107.

Then, if the voltage across the photo-multiplier load resistance 81 is too high (i.e. more negative), the comparison amplifier 55 will apply a more negative voltage to the high voltage-controlling tube 71. That in turn lowers the current flowing in the high voltage circuit (including lead 107) and thus reduces the voltage applied to photo-sensitive element 48 until it equals the reference voltage (across line 106). Conversely, if the voltage across the photo-multiplier load resistance 81 is too low (i.e. more positive), the reverse takes place starting with the application of a more positive voltage by the amplifier 55 to the voltage controlling tube 71.

As the comparison amplifier can develop a controllable voltage from a very small difference between the voltage across the load resistance 81 and the reference voltage line 106, it can reduce this difference to a negligible quantity if, with the highest supply voltage (from high voltage supply 51), to the photo-multiplier, there is available sufficient light to develop an output voltage across the photo-multiplier load resistance equal to that of the reference voltage.

Then, during the second phase (half cycle) when the sample cell intersects light beam 32, switch reed 83 is moved so that it is closed on contact 109 of switch 84, and at the same time opens the input to the amplifier. This leaves the memorizing condenser 94 which retains the voltage of the previous phase (or half cycle), in the line between contact 96 and grid 91. This intervention of memorizing condenser 94 enables the voltage applied on the dynodes of photo-multiplier 48 to remain the same and for the sensitivity of the photo-multiplier to remain the same. (Condenser 95 serves merely to balance the memorizing condenser.)

The photo-multiplier's output is proportional to the intensity of the light falling on its photo-sensitive cathode 47 at constant dynode voltage. Consequently, the ratio of the output voltage of the photo-multiplier across its load resistance 81 at this second phase to the control or reference voltage (i.e. the output of the previous, or first, phase) is the same as the ratio of the intensity of the light beam 32 emerging from the sample cell 34 to the intensity of the beam emerging from the reference cell 33. Then, by having the intensity of the incident light entering each of the comparison cells remain the same during both phases of a whole cycle, the voltage ratio that is impressed at contact 109 is proportional to the percent light transmission of the sample with respect to that of the reference. Before the beginning of the first phase of the next cycle, the wave length of the light incident on the reference cell is changed. However, the output still is that equal to the reference voltage, and the output on contact 109 during the second phase still gives the ratio corresponding to the percentage transmission, i.e. the transmittance.

By thus changing the wave length of the exit beam 32 from the monochromator after the completion of each full cycle, or before the beginning of each new cycle, a continuous series of signals giving the ratio corresponding to the percentage transmission between the reference and the sample for each succeeding cycle can be transmitted to the recorder 125 and in known manner be recorded as a continuous curve.

The recording spectrophotometer is a complete device at this point. However, its utility can be extended to give other mathematical relationships between the light emerging from the comparison cells, such as the percentage absorption, i.e. the absorptance. In this case, at reed 83 of mechanical switch 84, the voltage changes from a value ($a$) that is proportional to the light emerging from the reference cell to a value ($b$) that is proportional to the light emerging from the sample cell. Since the voltage proportional to the light emerging from the reference cell is maintained almost the same as the reference voltage, the difference between the values ($a$) and ($b$), or the fluctuating amplitude of the voltage (from one phase to the next of the same cycle) is proportional to the percent absorption of the light by the sample with respect to the reference or control. The corresponding reading can be produced on the recorder 125 by the transmission of a continuous series of signals from reed 83 giving the percentage absorption through a circuit referred to as the demodulator circuit (Figure 5).

The use of the percentage absorption signals provides at least two advantages over signals of percent light transmission, namely, (1) it is more precise for small values of absorption, and (2) it is more readily transformed into optical density readings which are discussed further below.

The demodulator circuit

The demodulator circuit (Figure 5) serves to demodulate the output signals from the light ratio detector switch reed 83 of the mechanical or vibrator switch 84, which are proportional to the light absorption by the sample cell in relation to that by the reference or control cell, and to convert them to a series of signals accurately proportional to the logarithm of this ratio. This provides the ease of working with a linear record.

This series of signals output from contact 96, proportional to light absorption, is transmitted from terminal 111 (Fig. 4) through line 112 to a capacitor 113 of the demodulator 114 (in Fig. 1). The capacitor 113 passes the alternating voltage component of that output and stops its direct current component. This alternating voltage is then transmited to a rectifier 115 (also in Fig. 5), advantageously another single pole double throw mechanical or vibrator switch (also shown in Fig. 6) like, and conveniently positioned immediately below, switch 84, and likewise with its switch reed (or single pole) 116 similarly linked to drive arm 38 at the lower part of its pivot joint 117, and rectified thereby into a direct voltage. This direct voltage then charges a second capacitor or condenser 118, or, with this condenser by-passed or omitted, can go directly to the filter 119.

In the filter 119, which can consist of one or more resistance and condenser combinations in series, the direct voltage is smoothed out before being transformed into an output of lower impedance by the cathode follower 120. This cathode follower 120 provides the driving circuit which, with switch 121 closed on contact 122, contributes to the operation of the recorder 125 to provide a curve or graph record of the percentage light absorption by the sample in relation to the control or reference. Where necessary to control the range of the recorder to record the graph within the bounds of the recorder face, a range control circuit 124 can be included.

Density recording circuit

In many cases, a record of the optical density is of considerable advantage. The recording spectrophotometer of the invention can record that relationship by the inclusion of an absorption to density transforming circuit between the cathode follower 120 and the recorder 125 or the range control circuit 124.

Absorption (=A) and optical density (=D) are related by the equation $D = -\log(1-A)$ which can be expressed also $A = 1 - \exp.(-2.3D)$. This equation is analogous to the relationship of the voltage on a capacitance (=C) charging through a resistance (=R) and represented by the expression $$\frac{E}{E_0} = 1 - \exp.\left(-\frac{t}{RC}\right)$$

wherein $E_0$ is the voltage from a constant voltage source, E is the voltage corresponding to percentage absorption, and $t$ is the time from the beginning of charging to the point when the voltage E is measured.

Thus, by comparing the voltage (E) on the capacitance (C) with the output voltage of the cathode follower driving circuit 120, which output voltage corresponds to the various values for the absorption (A), the time ($t$) from the beginning of the charging to the point when these two voltages are equal is proportional to the optical density (D). Such comparison is carried out by an electronic circuit that converts the light absorption impulses to optical density impulses.

This circuit for transforming light absorption impulses into optical density impulses is added to the percentage absorption circuit described above by shunting the output from cathode follower 120 into a relative density impulse generating circuit such as illustrated in the lower half of Figure 7. Thus, flow of any impulse from cathode follower 120 directly to the range control 124 or recorder 125 is broken by pulling switch 121 away from contact 122 and closing the switch on contact 127. Then the output impulses from cathode follower 120 flow through lead 128 to lead 129 and thus to a high gain D.C. comparison amplifier 130.

Separately a sawtooth wave-form voltage, for the exponential charging curve (represented by the last of the three equations above) is produced by a continuously repeating switch 131, the functioning of which is timed accurately to give forth a series of impulses synchronized with a fixed cycle frequency. Such repeating switch can be an electronic switch such as a thyratron or even a continuously mechanically operating switch, or any other such suitable switch. The series of impulses from switch 131 can be timed accurately in synchronism with a fixed cycle frequency, for example, by operating a thyratron as the switch from an ordinary A.C. line say at a line frequency of 60 cycles per second, such as the constant voltage source 132 (which conveniently can be the low voltage power supply 53) in line with the charging condenser 133.

Then the time intervals (for $t$ of the last equation given above) are measured simply by comparing the sawtooth voltage developed by switch 131 (and from charging condenser 133) at terminal 134 with the output voltage from cathode follower 120 (corresponding to the absorption value) at terminal 135, within the high gain D.C. comparison amplifier 130.

The latter advantageously can consist of two twin triode vacuum tubes (connected with one another the same as are the two twin triodes of comparison amplifier 55) and with the output from either one of the plates of the second twin triode feeding as input to a single triode. Comparison amplifier 130 functions then only to compare the magnitude of two voltages (namely, the one from cathode follower 120 as input to one of the grids of the first twin triode of amplifier 130, and the other from charging condenser 133 going as input to the second grid of the same triode) that enter at its terminals 135 and 134 respectively.

Accordingly, the output voltage at terminal 137 of amplifier 130 has one value when the voltage impressed at terminal 134 is greater than that impressed at terminal 135 and another value when the reverse occurs. Thus, the comparison of the two input voltages by comparison amplifier 130 is converted in it to a rectangular wave which then sharply defines the time intervals over which these voltages are equal.

This rectangular wave (which is the output voltage at terminal 137 of comparison amplifier 130) then is clamped between two fixed, known voltage values by a voltage limiter 138 of suitable available known structure, for example, a twin diode with its associated voltages derived from a positive voltage supply, say 150 volts, for example, from low voltage supply 53.

The average (voltage) value of the thus clamped rectangular wave (which, except for a constant D.C. level that might ordinarily be introduced by the voltage limiter itself, as is well-known, is proportional to the time duration, $t$, being measured) is obtained by filtering out its entire alternating component by means of the filter (averaging circuit) 140. This filter can consist, for example, of the common resistance with condenser type, with or without connection to a cathode follower.

From the filter (averaging circuit), the output impulses flow through lead 141 to lead 142 and thus to contact 127 and through switch 121 and to the recorder 125 to record the light density curve passing through, or bypassing, range control circuit 124 depending on whether or not range control is needed. The range control circuit can be of the type commonly employed on continuous recorders, on which a moving pen is continuously recording a curve, to confine the travel of the pen within the area of the exposed face of the recorder.

The chart-driving mechanism of recorder 125 is operated in synchronism with the rotation of the monochromator turn-table or prism by being linked to its shaft through suitable mechanical means such as intermeshing gears or applicable electrical devices such as synchronous motors at like speeds of rotation, or other known means.

*Operation of the light system*

Lamp 22 of light source 21 can be an ordinary tungsten light bulb and thus serve as the source for both the visible and infra-red portions of the spectrum.

Lamp 145 of light source 21 can be some suitable source of ultra-violet light, for example, a hydrogen lamp likewise enclosed in a housing 146 having a light port 147 facing collimating lens 148. Lamp 145 is conveniently located so that, if not blocked off, light travels directly through port 147 to monochromator entrance mirror 27.

Angularly swingable mirror 26, by its vertical sleeve 149 rigidly fixed to one of its ends and rotatably embracing vertical pivot post 151, is mounted on this post so as to be swingable in a horizontal arc about it.

Lamp 22 is located with respect to lamp 145 and swingable mirror 26 and its pivot post 151 that the latter is at the end of mirror 26 nearer both collimating lenses 25 and 148. With mirror 26 positioned (as shown by the dotted lines in Fig. 1) parallel to the path of the light from lamp 145, travel of light from lamp 22 is blocked by mirror 26. Then on rotating mirror 26 (backwardly to the left, Fig. 1) to an angle of about forty-five degrees to the path of the light from lamp 22, mirror 26 crosses the path of, and blocks, the light from lamp 145.

Then light from lamp 22 leaves housing 23 through port 24, passes through collimating lens 25 to, and is reflected by, angularly positioned mirror 26 to monochromator entrance mirror 27 and diverted by it through entrance slit 28. When working within any portion of the visible range of the spectrum, the monochromatic beam 32 leaving the monochromator through its exit slit 31, after passing through the reference and standard cells in sequence, alternately impinges on the photo-multiplier 48 as already described.

For working in the ultra-violet portion of the spectrum, hydrogen lamp 145, the source of ultra-violet light, is kept already lighted while its light is blocked by mirror 26 which is then rotated about its pivot post 151 downwardly and to the right (dotted line position in Fig. 1) to cross the path of, and block, the light from lamp 22. Then ultra-violet light from lamp 145 leaves housing 146 through port 147, passes through collimating mirror 148 to, and is reflected by, mirror 27 into the monochromator entrance slit 28 in the same way as was the visible light. Then the emerging beam 32 impinges on the same photo-multiplier 48, and behaves in the same way, as did the emerging beam that originated from the visible source.

For working in the infra-red range, mirror 26 is swung back to the position whereby it crosses the path of, and blocks, the light from lamp 145, and at the same time unblocks the light from lamp 22 so that it can travel into the monochromator 30 in the same way as described above for the visible light. However, since photo-multiplier 48 is not effective with infra-red light, the emerging monochromatic light beam 32 is diverted, for example, by a mirror 152 (Figs. 1 and 3) introduced across its initial path, as described below, to impinge on a photo-electric element that is sensitive to it, such as the lead sulfide photo-resistance cell 153.

Mirror 152, by its horizontal sleeve 154 rigidly fixed to its end near guide-track 37 and rotatably embracing horizontal pivot pin 155 firmly held in spaced apart sleeves 156 straddling sleeve 154 and projecting from the guide-track frame-work, is swingable in a vertical arc about pivot pin 155 (Fig. 3). A short pin 158 extends horizontally tangentially outwardly from the end of mirror 152 opposite its sleeve 154. To pin 158 is rotatably engaged the lower end of the vertically-extending, mirror-adjusting linkage 159 with its upper end passing through a guide plate 160 (supported, for example, from the light ratio detector and amplifier housing) and terminating in a gripping-knob 161.

When the mirror 26 is swung back to block the light from lamp 145, mirror 152 is rotated about pin 155 to a position about forty-five degrees from the horizontal (dotted lines Fig. 3) by raising gripping-knob 161. A suitable stop (not shown) on linkage 159 can indicate when the desired position is reached. Then the monochromatic light beam 32, after passing through each of the comparison cells, is deflected by mirror 152 into and through light cone 163 to impinge on lead sulfide cell 153.

While mirrors 26 and 152 can be shifted separately manually, as indicated, to whichever position is required by the particular wave length of light being passed through the comparison cells, they can be shifted jointly by connecting their respective shifting mechanisms by suitable linkages. Alternatively, they can be automatically shifted by suitable mechanisms, mechanical or electrical or both, initiated by suitable starting arms or contacts that go into operation when the monochromator turn-table or prism reaches a position where there is a change to or from the infra-red region of the spectrum.

*The light ratio detector and amplifier using photo-electrical cell sensitive to infra-red light*

With the lead sulfide cell exemplifying the photo-electric element in the light ratio detector and amplifier as responsive to the monochromatic beam of infra-red light, it is advantageous to use some minor modification (Fig. 8) in the ratio detector and amplifier as to some of the individual elements included, although its general operation is fundamentally the same as given as to the specific circuit in Fig. 4.

This modification of the light ratio detector and amplifier includes (*a*) the lead sulfide cell 153 as its photoelectric cell, (*b*) the direct coupled amplifier having a cathode follower 174 and a comparison amplifier consisting of the twin triode 186 and the tetrode (having twin grids) 187; (*c*) the memorizing condenser 194; and (*d*) the voltage controlling vacuum tube 171.

By its hook-up with its mechanical or vibrator switch 184 and through lead 252 from terminal bar 254 with the low voltage power supply 53 (Fig. 1) for the filaments and plates of the vacuum tubes of its comparison amplifier, this light ratio detector and amplifier (Fig. 8) likewise converts into a direct current voltage the alternating current signals produced by the photo-electric (light sensitive) element 153 by the impingement on its photo-sensitive surface of the monochromatic light beam alternately emerging in sequence from each of the comparison cells 33 and 34 respectively, and also amplifies that direct current voltage.

Through lead 247 photo-resistive (or photo-conductive) cell 153 is connected to ground. Then the voltage impulse developed in it from the impingement on it of the light beam 32 emerging alternately from the comparison cells is output that through lead 282 is then applied as input to grid 173 of cathode follower 174. The photo-resistive cell load resistance 181 is inherent in photoelectric cell 153 itself.

Then the alternating current signal originating from photocell 153 and amplified in cathode follower 174 leaves it as output from its cathode 177 when it is split in parallel with one branch going as an alternating current to terminal 211. The other branch goes to switch reed 183 of the single pole double throw vibrator switch 184 to be rectified into a direct current impulse to go to the comparison amplifier.

Before starting spectrophotometrical analysis with the apparatus of the invention, with the light ratio detector and amplifier circuit illustrated in Figures 4 and 8 and also with the demodulator circuit, two adjustments are initially made. One of them is the zero line adjustment on the recorder 125. For that the same solution is placed in both comparison cells. The spectrophotometer is then operated and the necessary adjustment is made through the cathode follower driving circuit of the demodulator until the recording implement of the recorder 125 traces its markings for this zero absorption reading along the zero line of the chart.

Then the spectrophotometer is operated with the cell in the sample position replaced by a piece opaque to light and the adjustable contact along the reference voltage resistor (106 in Fig. 4; 206 in Fig. 8) is moved until the recording implement of recorder 125 traces its markings for one hundred percent absorption along the one hundred percent line of the chart. Thus, the reference voltage is set in the light ratio detector and amplifier.

Switch reed 183 of vibrator switch 184 is linked to driving arm 38 for comparison cell carriage 36 at the pivot joint 117 so that each time when reference cell 33 is in its position intersecting monochromatic light beam 32, switch reed 183 is closed on contact 196. Thus, with contact 196 connected through lead 193 to grid 191 of twin triode 186, a direct current input is delivered to the comparison amplifier at grid 191. Lead 193 also connects the memorizing condenser 194 with grid 191.

The output of twin triode 186 goes through lead 198 as input to grid 199 of tetrode 187. From its plate 200 output of tetrode 187 goes through lead 201 to grid 202 of the voltage controlling vacuum tube triode 171 by which through line 207 the adjusting voltage from the comparison amplifier is transmitted to the photo-sensitive cell 153. Because the latter operates at a much lower voltage than does photo-multiplier 48 of the circuit used when working in the ultra-violet and visible light ranges, the plate or anode 203 of voltage controlling triode is powered from terminal bar 254 of low voltage supply 53.

Except for this last difference required by the use of the different photo-sensitive element 153 with its inherent load resistance 181, the respective functions of the other elements of this circuit of Fig. 8 parallel the functions of the corresponding elements in the circuit of Fig. 4. To indicate such parallel functions, wherever possible, the elements in the circuit of Fig. 8 were assigned reference numerals one hundred higher than that of the corresponding element in the circuit of Fig. 4. Accordingly, these particular functions and details of their relative operation need not be so fully set forth as they are as to the particular parts and combinations of them in the circuit of Fig. 4.

When switch reed 183 is closed on contact 196 (when light beam 32 passes through reference cell 33), the same output voltage from cathode follower 174 impressed as input to grid 191 of twin triode 186 is also impressed on memorizing condenser 194. Thus, when driving arm 38 advances moving reference cell 33 out of the light path and sample cell 34 to intersect light beam 32, switch reed 183 is moved away from contact 196. Then output from cathode 177 of cathode follower cannot go to grid 191 of twin triode 186 and goes only to terminal 211.

Then memorizing condenser 194 will impress on grid 191 of twin triode 186 the same voltage as was the input to grid 191 from contact 196 during the immediately preceding phase when the reference cell intersected the light beam. Now, since photo-resistive cell load resistance 181 is different from what it was during the preceding phase (with the reference cell across the light beam) and thus differs in its ratio to reference voltage 206, the resulting input to grid 202 of photo-cell voltage control triode 171 will be different from what it was in the immediately preceding phase. Accordingly, with its anode 203 connected to the constant voltage supply 53 through terminal bar 254, an adjusting D.C. voltage is impressed through line 207 to photo-sensitive cell 153 and in turn to terminal 211. Incidentally, since the output at terminal 211 goes through lead 112 to the demodulator, this is the direct current component, accompanying the alternating current from terminal 211 (and similarly from 111), that is stopped in the capacitor 113 of the demodulator circuit.

A similar adjustment but of different value occurs between the second and first phases of each full cycle as the wave length of the monochromatic light beam 32 is changed for each cycle. Any of the other circuits, such as those shown in Figures 3, 5, 6 and 7, used in conjunction with the light ratio detector and amplifier of Fig. 4, can be used in the same way with that one of Fig. 8.

Instead of mounting the comparison cells on a carriage reciprocating over guide-tracks as shown in Figures 1 and 2 to place them alternately successively across the single monochromatic light beam in its single fixed path, the cells can be placed on a carrier rotated in a horizontal plane about a vertical axis between them with the cells placed symmetrically with respect to it. Such carrier can be rotated by a connecting rod (or pitman)

running from the end of the present driving arm 38 (opposite its linkage to connecting rod 41) to a crank pin depending from the bottom of the rotatable carrier and offset from its axis. The same linkage of each of the switch reeds of the vibrating switches illustrated in Figures 1, 3 and 6 can also be used in this modification.

However, instead of these vibrating switches, the rectification in synchronism with the alternating of the comparison cells can also be carried out with the just above described modification by corresponding switches operated by the rotating base of the rotating carrier for the cells to open and close the corresponding circuits in phase with the alternating crossing of the light beam. Thus, the three lines that would connect with the base of a vibrator switch can instead end with exposed terminals spaced shortly apart from one another in a vertical line near, and facing, the periphery of the base of the rotating carrier for the comparison cells. Then mounted on the outer periphery of the base of the carrier at a location corresponding to that when the reference cell intersects the light beam is a conductor strip at a level to contact the upper two of the three exposed terminals at that time to complete the circuit corresponding to that when switch reed 83 would have been on contact 96. Then diametrically opposite that conductor strip (corresponding to the sample cell across the light beam) is a second such conductor strip but at a slightly lower level so as to contact only the middle and lowest one of the three exposed terminals. While the insulated adjustment screws can be used for adjustment between the switch reed and the contacts in the vibrator switches to compensate for differences in cell wall thickness when a different pair of cells is used, no such adjustment appears to be needed with the just described switch modification.

Mirror 26 may be eliminated by mounting light source base 21 on a pivot located, for example, about where mirror 26 would intersect the beam of light from lamp 145. Then to change from ultra-violet light to visible or infra-red, base 21 can be rotated about the pivot only through an arc sufficient for the light from lamp 22 to travel directly to monochromator entrance mirror 27. Similarly, it is possible also to eliminate collimating mirror 25 by having collimating mirror 148 mounted separately and lamps 45 and 22 carried on an arcuate base to be rotated independently about a pivot or on curved tracks underneath it to move lamp 146 and its housing away and swing lamp 22 and its housing in their place. Obviously, the wires leading to the lamp sockets need to be loose and long enough to allow this replacement.

Alternatively, the separate base for the two lamps can be straight with the two lamp housings alongside of one another with their ports facing a vertical plane between the monochromator slits and the center of the photo-electric element. Then this base need only to be shifted parallel to that plane for one light source to replace the other. This shifting of such separate base for lamps 145 and 22 and their housings can be done by moving a lever by hand or by opposed solenoids.

In place of the lead sulfide cell or any other photo-resistive or photo-conductive cell, there can be used some other photo-electric element responsive to infra-red light that can convert light energy to an electrical signal of a magnitude corresponding directly to the light flux reaching it, for example, a thermocouple with necessary circuit modification.

The photo-electric element responsive to infra-red light need not be used solely with the circuit shown in Figure 8. Instead two suitable switches can be included in the circuit of Figure 4, one to enable disconnecting lead 82 from anode 10 of photo-multiplier 48 and in turn to connect lead 82 to the photo-resistive cell 153. The other switch is to enable disconnecting plate or anode 103 of voltage-controlling triode 71 from the high voltage power supply lead 52 and in turn to connect anode 103 to the line running from the positive voltage terminal of low voltage supply terminal bar 54.

The chart-driving mechanism of the recorder can carry a switch arm connected to one line of an electric circuit to close the circuit when the wave length is to change from the visible range of the spectrum to the ultra-violet. That circuit can operate a solenoid that in turn either can shift mirror 26 to its dotted line position in Fig. 1, or, in the modification without mirror 26, can replace lamp 22 by lamp 145. The chart-driving mechanism also can carry a second switch arm connected to a line of another electric circuit to close that circuit when the wave-length is to change from the visible range of the spectrum to the infra-red. That circuit can operate such solenoids as are needed in turn to shift mirror 152 to its dotted line position in Fig. 3 and to operate the switches to cut photo-multiplier 48 out of the circuit of Fig. 4 and connect lead sulfide cell into it and at the same time cut anode 103 of voltage-control triode 71 out of the high voltage supply line and connect it into the low voltage supply line. These two switch arms can be placed on some other part of the system associated with changing of the wave-length, such as the shaft operating the wave-length changing turn-table or prism in the monochromator. However, since the monochromator can be purchased independently, it may be more advantageous to have these switch arms associated with the chart-drive mechanism.

The circuits of Figures 4 and 8 have their various elements arranged for the electric impulses generated by the photo-sensitive element first to be amplified and then rectified. These particular portions of these circuits can be re-arranged for these impulses first to be rectified and as rectified to be amplified.

The cathode follower in either the light ratio detector or in the demodulator circuit, or in both of these circuits, can be replaced by some other suitable amplifier, for example, a magnetic amplifier or a transistor. So also any of the single or twin triodes or any tetrode can be replaced by some other suitable amplifying element. Where two stages of amplification are shown as in the comparison amplifier 55, one stage can be omitted so long as the other has adequate capacity.

In place of the demodulator circuit, any other suitable rectifier or rectifying circuit can be used.

While the invention has been described in relation to certain specific embodiments of it, it is understood that various substitutions and modifications can be made in them within the scope of the appending claims which are intended also to embrace equivalents of the various modifications specifically disclosed.

What is claimed is:

1. Means for comparing the intensities of two radiations, which means comprises a photo-sensitive element for converting into electrical impulses radiations impinged on it and whose electrical output varies with the incident radiation intensity and the applied voltage, means for impinging radiations separately in sequence on said element; means for rectifying, synchronously in phase with each of the radiation intensities being compared, the electrical output of the photo-sensitive element; means for maintaining at a reference value the electrical output of this element corresponding to a reference one of the incident intensities by controlling with a comparison amplifier the voltage applied to the photo-sensitive element; and means for indicating the ratio of the second one of the two intensities being compared to the first one of said two intensities as the output of the photo-sensitive element when the second radiation intensity is incident upon the photo-sensitive element.

2. Comparison means as claimed in claim 1, wherein the means for controlling the electrical output of the photo-sensitive element when the reference radiation is impinging on it, comprises a memorizing condenser.

3. Comparison means as claimed in claim 1, wherein the means for controlling the electrical output of the photo-sensitive element when the reference radiation is impinging on it, comprises a memorizing condenser and an amplifier and a voltage power supply to said amplifier.

4. Comparison means as claimed in claim 3, wherein the means for controlling the electrical output of the photo-sensitive element when the reference radiation is impinging on it, comprises a comparison amplifier having two input grids, one of them linked by a conductor to the reference voltage and the other linked by a conductor to the memorizing condenser.

5. Comparison means as claimed in claim 4, wherein the rectifier in the line going to the ratio indicating means is adapted to rectify the alternating output from the photo-sensitive element also in phase with each impingement of the reference radiation followed by the impingement of a second radiation on the photo-sensitive element.

6. Comparison means as claimed in claim 5, wherein the radiations, the intensities of which are compared, are those of a beam of monochromatic light passing along a single and fixed course through a standard reference and then through a sample as the beam is intersected successively alternately by reciprocating movement of them across the beam; and wherein the means for rectifying the alternating output from the photo-sensitive element in the line to the ratio indicating means is operated in phase with each intersection of the monochromatic light beam by means linked to means for moving the reference standard and sample alternately successively across the light beam.

7. In combination in a spectrophotometer, a holder for a standard reference and a sample, for comparison of radiation transmitted separately through each of them; a photo-electric element having a photo-sensitive surface to receive from a source of light within the visible and ultra-violet ranges of the spectrum, a beam of monochromatic light radiation directed to and impinging on said surface; a second photo-electric element having a photo-sensitive surface to receive from a source of infra-red light a beam of monochromatic infra-red light radiation directed to and impinging on said surface of said second element; each of said photo-electric elements being capable of converting the respective light radiation impinging on its photo-sensitive surface into an electrical impulse of a magnitude corresponding to that of the respective radiation flux reaching it; and means operable selectively to direct any one of said monochromatic light beams to the respective photo-electric element responsive to the particular light range of said beam, said means comprising a mirror adapted to be positioned to be inserted in the path of, and to deflect, the monochromatic beam from the photo-electric element responsive to ultra-violet and visible light to impinge on the photo-sensitive surface of the photo-electric element responsive to the infra-red light; and above the deflecting surface of the mirror for deflecting the monochromatic light beam to the photo-sensitive element responsive to infra-red light, a light-condensing cone out of the path of the incident beam to the mirror and having its larger end nearer the mirror and at its smaller end the photo-electric element responsive to infra-red light; reciprocatable means for reciprocating said holder and thereby to reciprocate the reference and sample successively alternately at a selectively fixed and constant frequency perpendicularly across the single and fixed course taken by such beam of monochromatic light; and recording means connected to means to operate them synchronously with said reciprocating means, for recording results of said comparison; which means for such reciprocation at a selectively fixed and constant frequency serves to enable the spectrophotometer to operate as an automatic recording one.

References Cited in the file of this patent
UNITED STATES PATENTS

| | | |
|---|---|---|
| 1,890,837 | Whalen | Dec. 13, 1932 |
| 2,096,323 | Gille | Oct. 19, 1937 |
| 2,339,053 | Coleman | Jan. 11, 1944 |
| 2,407,838 | Kliever | Sept. 17, 1946 |
| 2,503,165 | Meyer | Apr. 4, 1950 |
| 2,517,121 | Liston | Aug. 1, 1950 |
| 2,522,976 | Williams | Sept. 19, 1950 |
| 2,551,833 | Ewing | May 8, 1951 |
| 2,613,572 | Mathieu | Oct. 14, 1952 |
| 2,634,908 | Jackson et al. | Apr. 14, 1953 |
| 2,679,010 | Luft | May 18, 1954 |
| 2,684,443 | Tidball | July 20, 1954 |
| 2,709,943 | Frommer | June 7, 1955 |
| 2,721,262 | Dinger et al. | Oct. 18, 1955 |